United States Patent
Midorikawa

(10) Patent No.: US 9,539,981 B2
(45) Date of Patent: Jan. 10, 2017

(54) SEAT BELT RETRACTOR, CONTROL METHOD THEREOF, AND SEAT BELT DEVICE

(75) Inventor: Yukinori Midorikawa, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 1250 days.

(21) Appl. No.: 11/665,530

(22) PCT Filed: Oct. 19, 2005

(86) PCT No.: PCT/JP2005/019200
§ 371 (c)(1),
(2), (4) Date: Apr. 16, 2007

(87) PCT Pub. No.: WO2006/043590
PCT Pub. Date: Apr. 27, 2006

(65) Prior Publication Data
US 2007/0295852 A1 Dec. 27, 2007

(30) Foreign Application Priority Data
Oct. 19, 2004 (JP) .................................. 2004-304585

(51) Int. Cl.
*B60R 22/44* (2006.01)

(52) U.S. Cl.
CPC ........ *B60R 22/44* (2013.01); *B60R 2022/4473* (2013.01)

(58) Field of Classification Search
USPC .......... 242/374, 390.8, 390.9; 280/806, 807; 297/475–478, 480
See application file for complete search history.

(56) References Cited

U.S. PATENT DOCUMENTS

| 6,257,363 | B1 | 7/2001 | Midorikawa et al. |
| 6,332,629 | B1 | 12/2001 | Midorikawa et al. |
| 6,427,935 | B1 | 8/2002 | Fujii et al. |
| 6,767,031 | B2* | 7/2004 | Yamamoto .................... 280/806 |
| 2002/0096591 | A1* | 7/2002 | Tanji .......................... 242/390.8 |
| 2003/0224887 | A1 | 12/2003 | Bullinger et al. |
| 2004/0108697 | A1* | 6/2004 | Midorikawa et al. ........ 280/735 |
| 2005/0077412 | A1* | 4/2005 | Tanaka et al. ............. 242/390.9 |
| 2005/0082410 | A1* | 4/2005 | Tanaka et al. ............. 242/390.8 |

(Continued)

FOREIGN PATENT DOCUMENTS

| DE | 10059227 C1 * | 3/2002 |
| DE | 10066401 B4 | 3/2008 |

(Continued)

*Primary Examiner* — Sang Kim
(74) *Attorney, Agent, or Firm* — Stephen T. Olson; Harness, Dickey & Pierce, P.L.C.

(57) ABSTRACT

A seat belt retractor 100 includes stop state detecting means 118 which detects that a driving signal is not inputted to power generation means 110 and drawing-direction rotation detecting means 119 which detects that the power generation means 110 is rotating in a drawing-direction of a webbing 302. Here, a control means 200 controls the power generation means 110 to rotate in the drawing direction of the webbing 302, when the stop state detecting means 118 detects that the driving signal is not inputted to the power generation means 110 and the drawing-direction rotation detecting means 119 detects that the power generation means 110 is rotating in the drawing direction of the webbing 302.

7 Claims, 16 Drawing Sheets

(56) References Cited

U.S. PATENT DOCUMENTS

2005/0083000 A1* 4/2005 Specht et al. ................ 318/432

FOREIGN PATENT DOCUMENTS

| JP | 2000-71938 A | 3/2000 |
| JP | 2000-127896 A | 5/2000 |
| JP | 2001-063522 A | 3/2001 |
| JP | 2001-163185 A | 6/2001 |

* cited by examiner

SEAT BELT RETRACTOR, CONTROL METHOD THEREOF, AND SEAT BELT DEVICE

CROSS-REFERENCE TO RELATED APPLICATIONS

This application is a National Stage of International Application No. PCT/JP2005/019200, filed on 19 Oct. 2005. The entire disclosure of the above application is incorporated herein by reference.

TECHNICAL FIELD

The present invention relates to a seat belt retractor, a control method thereof, and a seat belt device, and more particularly, to a seat belt retractor, a control method thereof, and a seat belt device which can be easily fastened by drawing a seat belt without any resistance.

BACKGROUND ART

As a related seat belt device, a seat belt device in which an electric motor rotates a spindle and the spindle winds a webbing as necessary so as to constrain an occupant in a seat has been known (for example, referred to Patent Document 1). In the related seat belt device, a clutch is provided in a retractor. The clutch is generally released when the occupant rides and the webbing is drawn out and fastened in advance. The draw resistance of the webbing is in a lower state. Patent Document 1: Japanese Patent Unexamined Publication No. JP-A-2001-163185.

DISCLOSURE OF THE INVENTION

Problem that the Invention is to Solve

Meanwhile, in the seat belt device having the electric motor disclosed in Patent Document 1, the clutch is not reliably released due to a winding velocity or a winding timing of the webbing and the resistance of the webbing may increase. Accordingly, in order to obtain a comfortable operation environment of the seat belt, there are scopes to be improved.

The invention is made to solve the problem and an object of the invention is to provide a seat belt retractor, a control method thereof, and a seat belt device, wherein when the clutch is not released due to any problems in the course of drawing the webbing, the clutch is released forcibly and thus the webbing can be drawn without the draw resistance.

Means for Solving the Problem

The above-mentioned objects of the invention are accomplished by the following configurations.

(1) A seat belt retractor including a spindle winding a webbing; a power generation means which generates power for rotating the spindle in a desired direction; a power transmission means that enables transmission of the power of the power generation means to the spindle when the power generation means generates the power for rotating the spindle in a winding direction of the webbing, and also disables transmission of the power of the power generation means to the spindle when the power generation means generates a power in a direction opposite to the power for rotating the spindle in the winding direction; a control means which drives and controls the power generation means; a stop state detecting means which detects that a driving signal is not inputted to the power generation means; and a drawing-direction rotation detecting means which detects that the power generation means is rotating in the drawing direction of the webbing, wherein the control means drives and controls the power generation means to rotate in the drawing direction of the webbing, when the stop state detecting means detects that the driving signal is not inputted to the power generation means and the drawing direction detecting means detects that the power generation means is rotating in the drawing direction of the webbing.

(2) The power generation means is an electric motor, and the stop state detecting means and the drawing-direction rotation detecting means detect by measuring an electromotive force of the electric motor.

(3) The seat belt retractor further includes a drawing preventing means which prevents the webbing from being drawn by stopping the rotation of the spindle in the drawing direction of the webbing, when a rotational acceleration of the spindle in the drawing direction of the webbing is a predetermined value or more, or when a deceleration of a vehicle is a predetermined value or more; and a winding spring applying a torque in the winding direction of the webbing to the spindle.

(4) The seat belt retractor may be found in a seat belt device.

(5) A method of controlling a retractor including a spindle winding a webbing, a power generation means which generates power for rotating the spindle in a desired direction, and a power transmission means that enables transmission of the power of the power generation means to the spindle when the power generation means generates the power for rotating the spindle in a winding direction of the webbing, and also disables transmission of the power of the power generation means to the spindle when the power generation means generates a power in a direction opposite to the power for rotating the spindle in the winding direction, the method including judging whether a connection between the spindle and the power generation means by the power transmission means is released when the spindle rotates in the drawing direction of the webbing; and controlling to drive the power generation means, to rotate in the drawing direction of the webbing when the connection by the power transmission means is not released.

(6) When it is detected that a driving signal is not inputted to the power generation means and it is detected that the power generation means is rotating in the drawing direction of the webbing, it is judged that the connection by the power transmission means is not released.

Advantage of the Invention

In general, when the webbing is drawn by the manual operation for the occupant to fasten the seat belt, the clutch should be previously released by rotating the power generation means in the drawing direction of the webbing just before handling the seat belt. However, according to the seat belt retractor, the control method thereof, and the seat belt device of the invention, the power generation means rotates in the drawing direction of the webbing so that the clutch can be reliably released when the clutch installed in the power transmission means does not operate and thus the connection between the power generation means and the spindle is not released. In addition, since the occupant can easily draw and fasten the webbing without the extra drawing resistance, the occupant can obtain the comfortable operation environment without unpleasant sensation.

BRIEF DESCRIPTION OF THE DRAWINGS

FIG. 16A is a diagram illustrating a clutch-engaged state,
and FIG. 16B is a diagram illustrating a clutch-released state.

BEST MODE FOR CARRYING OUT INVENTION

Hereinafter, embodiments of a seat belt retractor, a control method thereof, and a seat belt device are described in detail with reference to the drawings.

Figure 1:
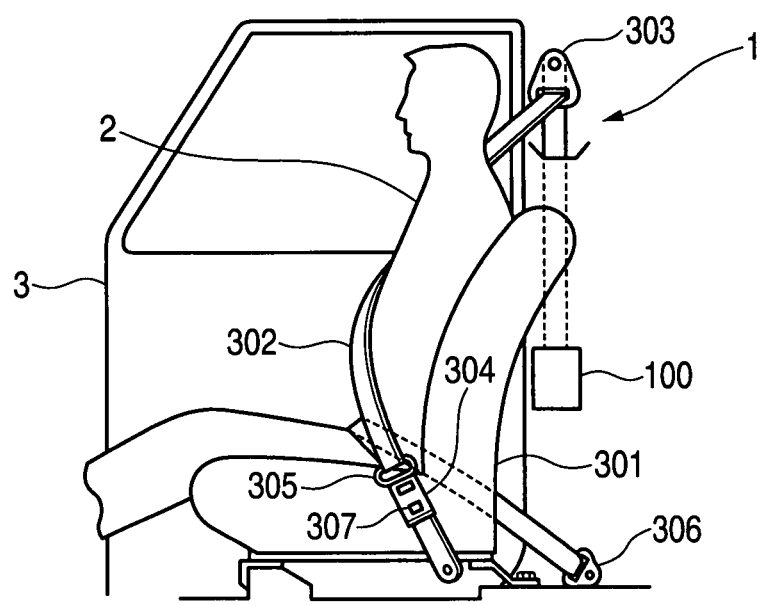
FIG. 1 is a schematic diagram of a seat belt device of the invention.
Figure 2:
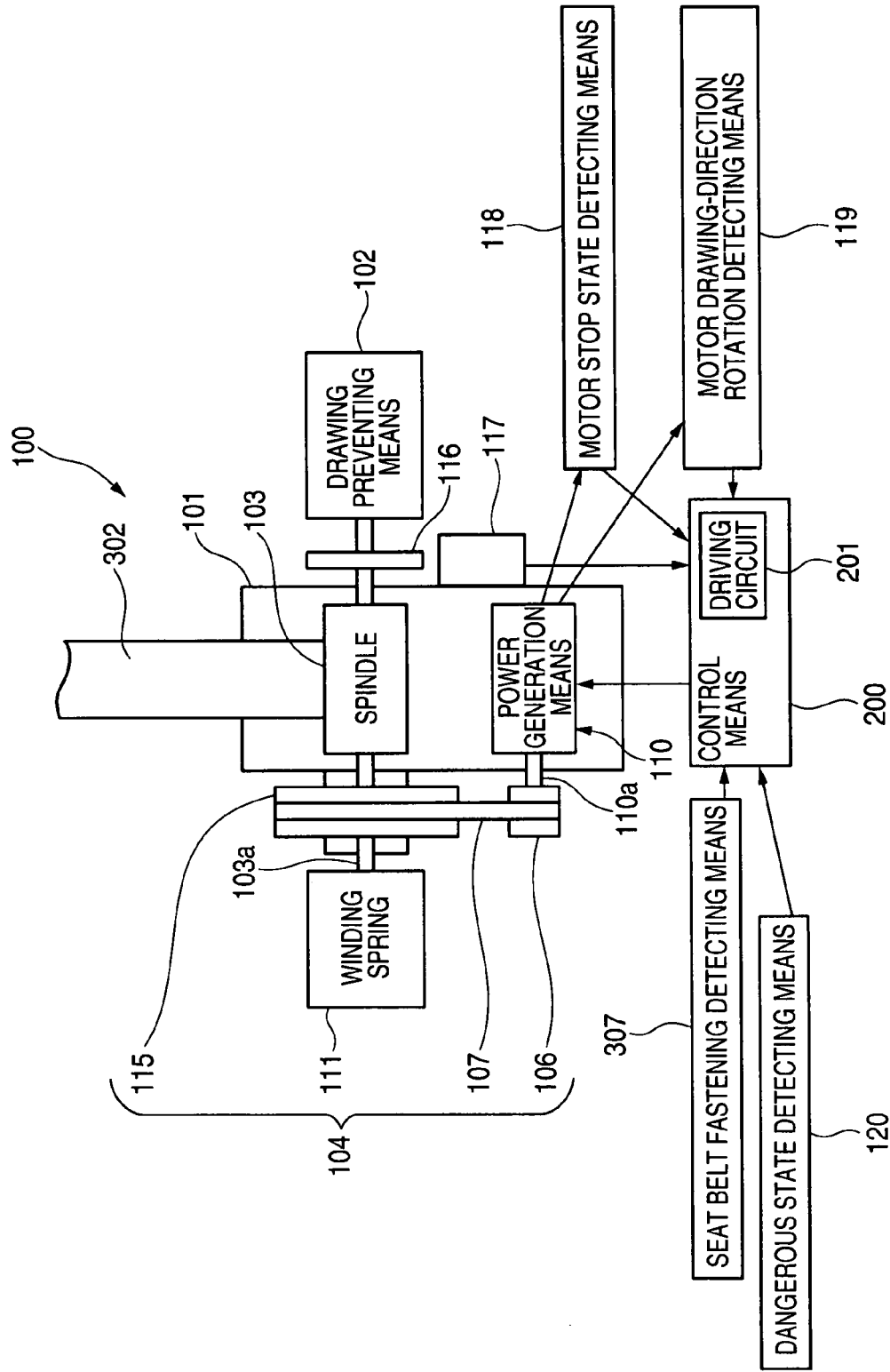
FIG. 2 is a schematic diagram of a seat belt retractor in FIG. 1.
Figure 15:
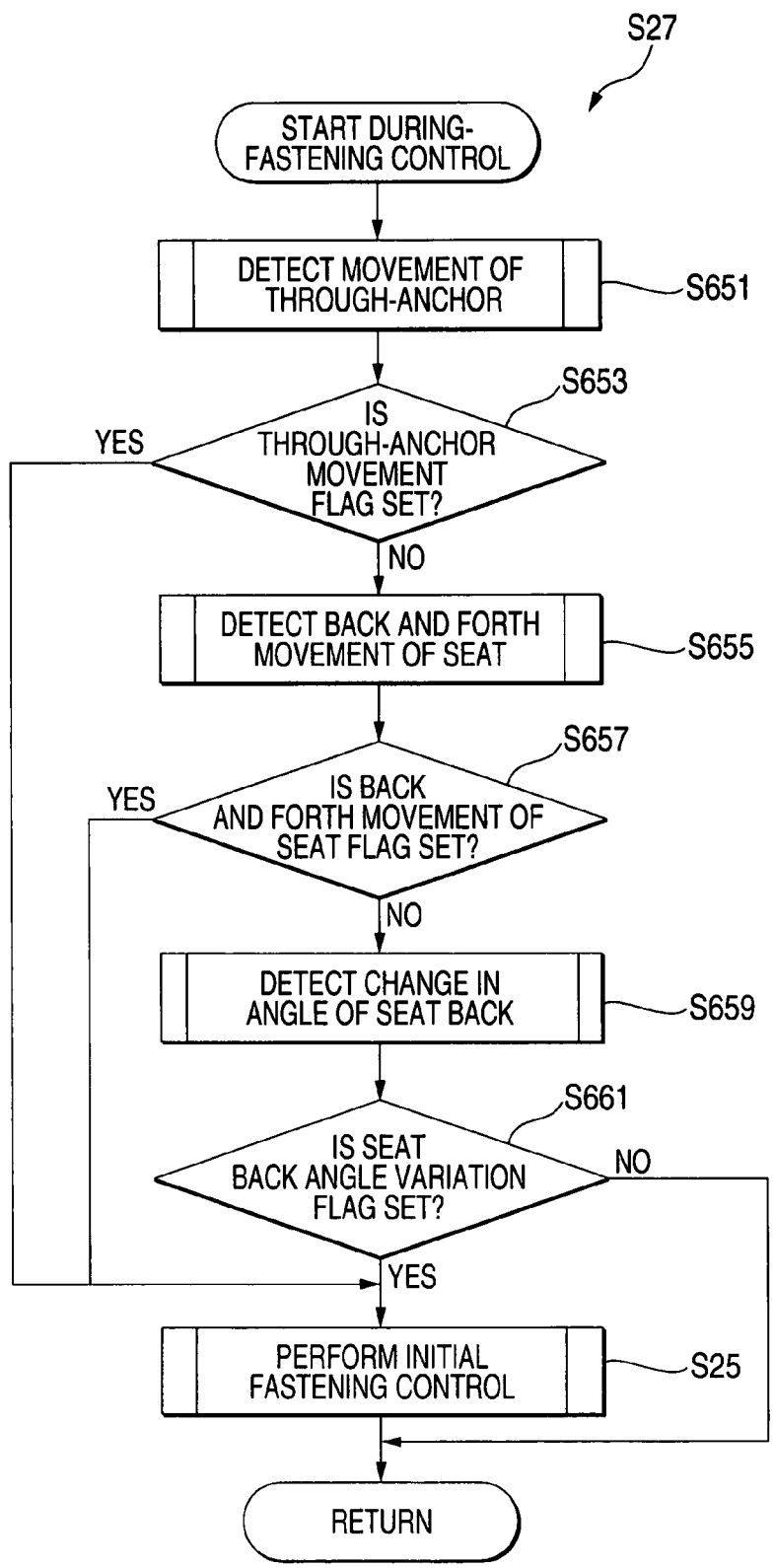
FIG. 15 is a flowchart of a during-fastening control.
Figure 16:
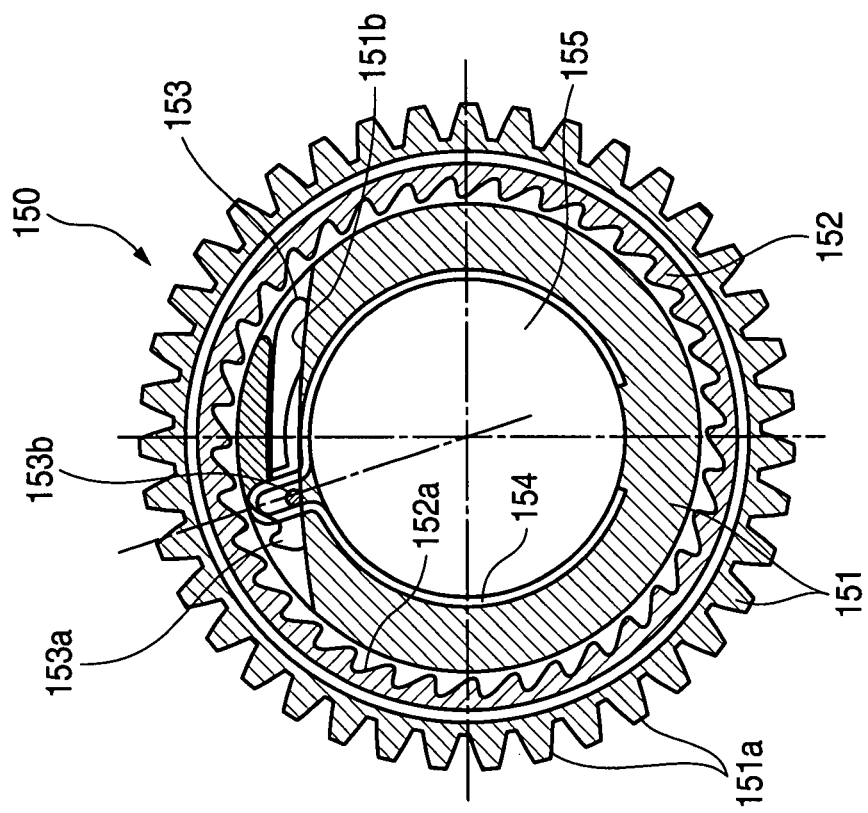
FIGS. 16A-16B are longitudinal sectional views of a power transmission means.
Figure 16:
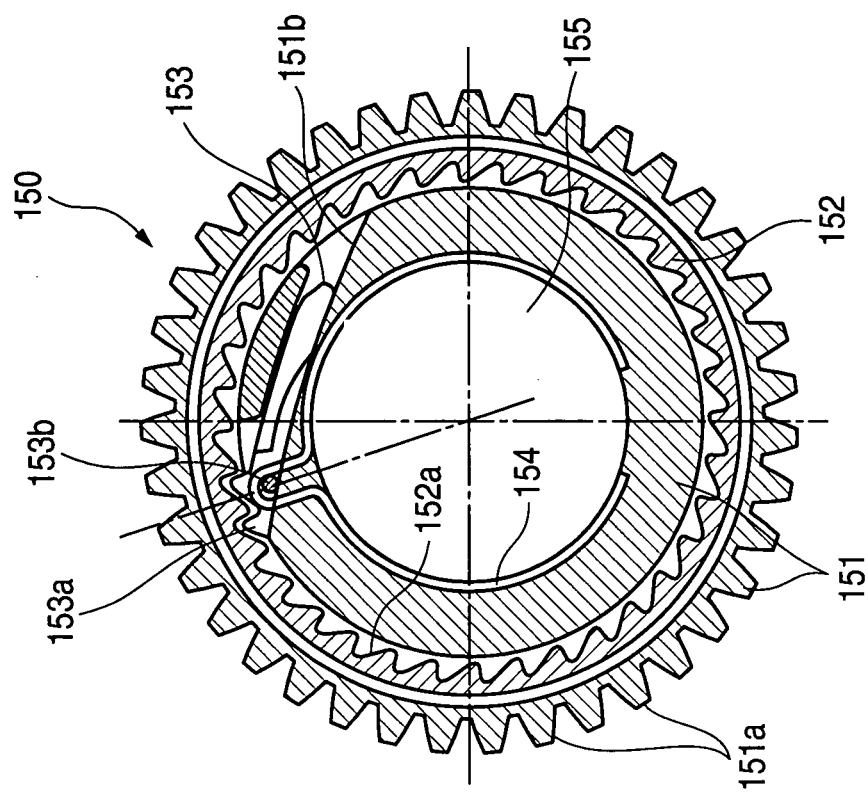

FIG. 1 is a schematic diagram of a seat belt device according to an embodiment of the invention, FIG. 2 is a schematic diagram of a seat belt retractor in FIG. 1, FIGS. 3 to 15 are flowcharts of controls for a seat belt retractor, FIG. 16 are longitudinal sectional views of power transmission means, FIG. 16A is a diagram illustrating a clutch-engaged state, and FIG. 16B is a diagram illustrating a clutch-released state.

As shown in FIG. 1, a seat belt device 1 includes a seat belt retractor 100 to which an end of a webbing 302 holding an occupant 2 to a seat 301 is fixed, a through-anchor 303 turning the webbing 302 in the vicinity of the shoulder of the occupant 2, a tongue plate 305 fitted to a buckle 304 through which the webbing 302 passes and which is disposed in the waist, an anchor plate 306 which fixes the other end portion of the webbing 302 to a vehicle 3, and a buckle switch 307 which is housed in the buckle 304 and detects fastening of the webbing 302.

As shown in FIG. 2, the seat belt retractor 100 of the invention has a frame 101. A spindle 103, which winds the webbing 302, and a spindle shaft 103a coupled to a left side of the spindle 103, which works as a central shaft of the spindle 103, are rotatably provided in the frame 101. In a right side of the spindle shaft 103a, a drawing preventing means 102 locking the drawing of the webbing 302 is provided. The drawing preventing means 102 has conventionally known means for operation. The drawing preventing means 102 performs a VSI operation locking the drawing of the webbing 302 when deceleration at a predetermined value or more acts on the vehicle 3 and a WSI operation locking the drawing of the webbing 302 when the webbing 302 is drawn at a predetermined acceleration or more. The drawing preventing means 102 is configured to allow the webbing 302 to be wound by an electric motor 110 as the power generation means of the invention even if the drawing of the webbing 302 is locked.

The spindle 103 is driven by the electric motor 110 through a power transmission means 104 and is rotated in the winding direction of the webbing 302 as necessary. In addition, the spindle 103 is connected to a winding spring 111 and torque in the winding direction of the webbing 302 is constantly applied thereto.

The seat belt retractor 100 has a control means 200 controlling the electric motor 110. The electric motor 110, for example, is a direct current motor ratable in a positive and negative direction on the basis of commands from a later-described driving circuit 201 in the control means 200. A motor stop state detecting means (stop state detecting means) 118 detecting that a driving signal is not inputted from the driving circuit 201 to the electric motor 110 and a motor drawing-direction rotation detecting means (drawing-direction rotation detecting means) 119 detecting that the electric motor 110 is rotating in the drawing direction of the webbing 302 by the electromotive force generated when the electric motor 110 rotates are connected to the electric motor 110.

The power transmission means 104 has a spindle side pulley 115 fixed to the spindle shaft 103a, a motor side pulley 106 fixed to a rotary shaft 110a of the electric motor 110, a timing belt 107 disposed between both pulleys 106, 115, and a later-described clutch 150 (refer to FIG. 16) housed in the spindle side pulley 115. When the electric motor 110 rotates in the winding direction of the webbing 302, the clutch 150 housed in the spindle side pulley 115 is engaged, the power of the electric motor 110 is transmitted to the spindle 103, the power rotates spindle 103, and thus the webbing 302 is wound. When the electric motor 110 rotates in the drawing direction of the webbing 302, the engagement of the clutch 150 is released and thus the power of the electric motor 110 cannot be transmitted to the spindle 103.

A magnetization disk 116 on which an N pole and an S pole are formed by turns is fixed to the spindle shaft 103a and magnetic field detecting means 117 is fixed to the frame 101. The magnetic field of the magnetization disk 116 varying in accordance with the rotation of the spindle shaft 103a is detected by the magnetic field detecting means 117, whereby the rotating direction and the number of rotations (angle of rotation) of the spindle shaft 103a are detected. Then, the detection signal is transmitted to the control means 200.

Specifically, the rotation of the spindle 103 is detected by the magnetization disk 116 provided on the spindle shaft 103a and two hall sensors (not shown) disposed so as to generate outputs of which phases are shifted each other by ¼, 2-phases pulse trains φ1, φ2 are generated, and thus the rotating direction and the number (angle) of rotations are sent to the control means 200. The pulse trains φ1, φ2 are digitalized by an up-down counter (not shown) in an input/output interface (not shown) of the control means 200 and are converted into outputs according to the drawing amount of the webbing 302.

The buckle switch 307 as seat belt fastening detecting means of the invention is housed in the buckle 304, detects whether the seat belt device 1 is fastened, and supplies the signals according to fastening or not to the control means 200. A dangerous state detecting means 120 judges the possibility that the vehicle 3 will collide with an obstacle (not shown) in the front, rear, and/or side of the vehicle 3, detects a distance from the obstacle by a distance sensor (not shown), calculates relative velocity obtained from variation in distance with lapse of time, calculates time to collision from the distance to the obstacle, judges a dangerous state when the time is less than a predetermined time, and supplies a signal according to the dangerous state to the control means 200.

The control means 200, for example, includes a CPU executing control programs, a RAM storing process data, a ROM in which programs are stored, a built-in timer, a micro controller (not shown) having an input/output interface converting a signal, and the driving circuit 201 which drives the electric motor 110 in accordance with an output from the micro controller. The input/output interface sets a belt-fastening flag and a danger flag to a not-shown flag register (or RAM) in accordance with signals from the buckle switch 307 and a dangerous state detecting means 120. The CPU checks a drawing amount of the webbing 302 through the input/output interface and sets various flags to the flag register.

For example, a drawing flag indicating the drawing of the webbing 302, a winding flag indicating the winding of the webbing 302, or a stop flag indicating that the webbing 302 is not drawn and wound are set to the flag register on the basis of difference between the previous amount and the current amount of the periodically monitored drawing amount of the webbing 302. The control means 200 can distinguish the drawing, winding, and stop of the webbing 302, the fastening of the seat belt, and dangerous state with reference to the various flags. The control means 200 controls the electric motor 110 on the basis of this information.

Next, the controls of the seat belt retractor 100 by the control means 200 are described in detail with reference to the flowcharts shown in FIGS. 3 to 15.

Figure 3:
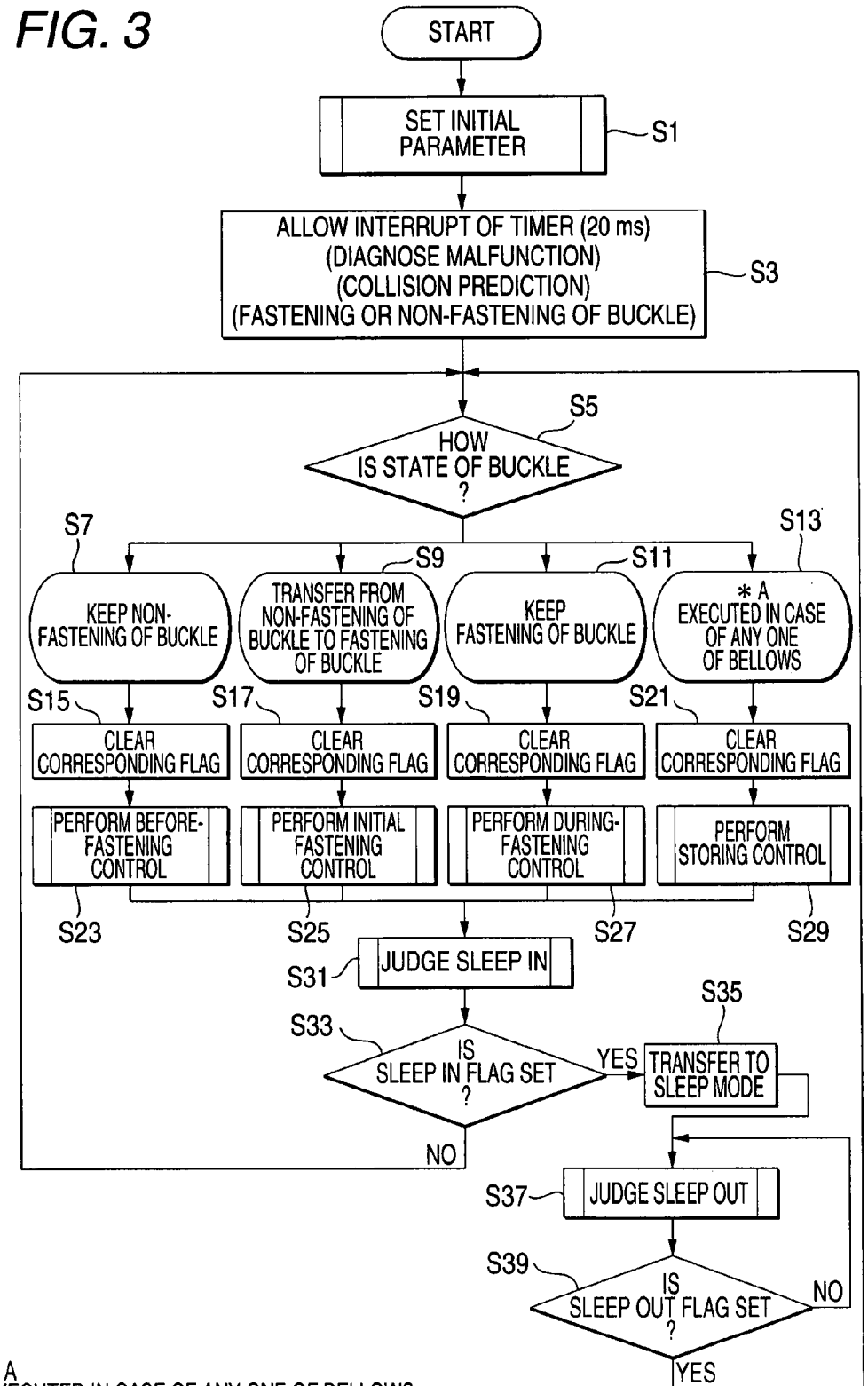
FIG. 3 is a flowchart of a basic control of a seat belt retractor.

Power from a battery line of the vehicle 3 is supplied to the control means 200. A flow of the basic control shown in FIG. 3 is executed when the retractor 100 of the invention is mounted to the vehicle 3 or when the control means 200 is connected to the battery line for repair, etc. Accordingly, the initial parameter setting (S1) and timer interrupt permission (S3) are not generally performed. The setting (S1) and the permission (S3) are preformed only when the initial mounting on the vehicle 3, or when the battery is detached and then remounted such as during repair.

Figure 4:
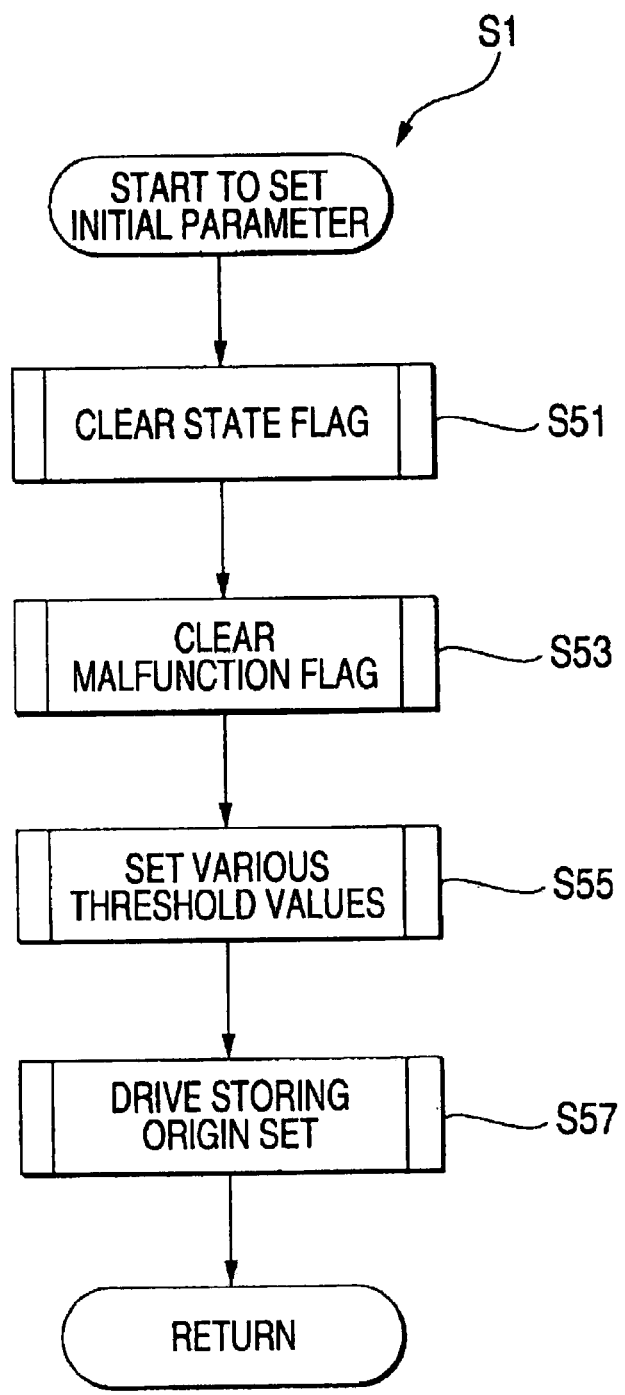
FIG. 4 is a flowchart of setting initial parameters.

The initial parameter setting (S1) is a control for setting the initial parameters. In the initial parameter setting (S1) as shown in FIG. 4, various state flags related to operation of the belt are cleared (S51), a malfunction flag is cleared (S53), various threshold values are set to predetermined values (S55), and then a storing origin setting operation is performed (S57).

Figure 5:
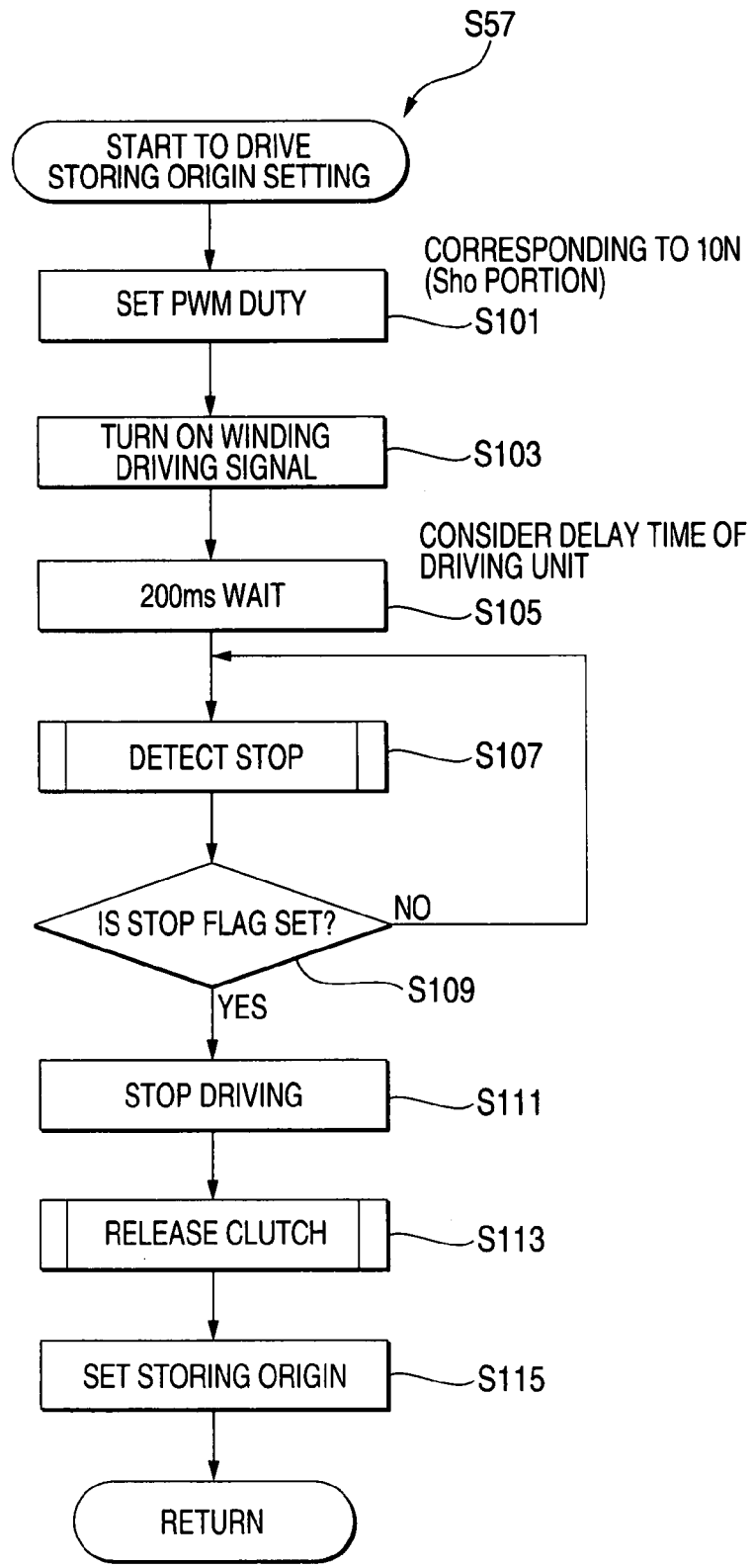
FIG. 5 is a flowchart of driving storing origin setting.

In the storing origin setting operation (S57), as shown in FIG. 5, the driving power of the electric motor 110 is set to control PWM duty ratio so that force in the shoulder portion of the occupant 2 is about 10 N (S101), and then the winding driving signal is changed to an ON state (S103) to drive the motor 110 with a predetermined winding force. In consideration of delay time of a driving unit, after a predetermined time elapses, for example 200 ms (S105), later described stop detecting (S107) (FIG. 6) is performed. Next, it is judged whether the stop flag is set or not (S109). When the stop flag is not set (S109: No), the operation returns to before the step of stop detecting (S107). When the stop flag is set (S109: Yes), the operation stops the driving of the motor (S111), releases the clutch 150 (S113) (FIG. 7), performs set storing origin in such a manner that a rotating amount of the spindle 103 detected by the rotation sensor at the position is set to the storing origin (S115), and then it returns.

Figure 9:
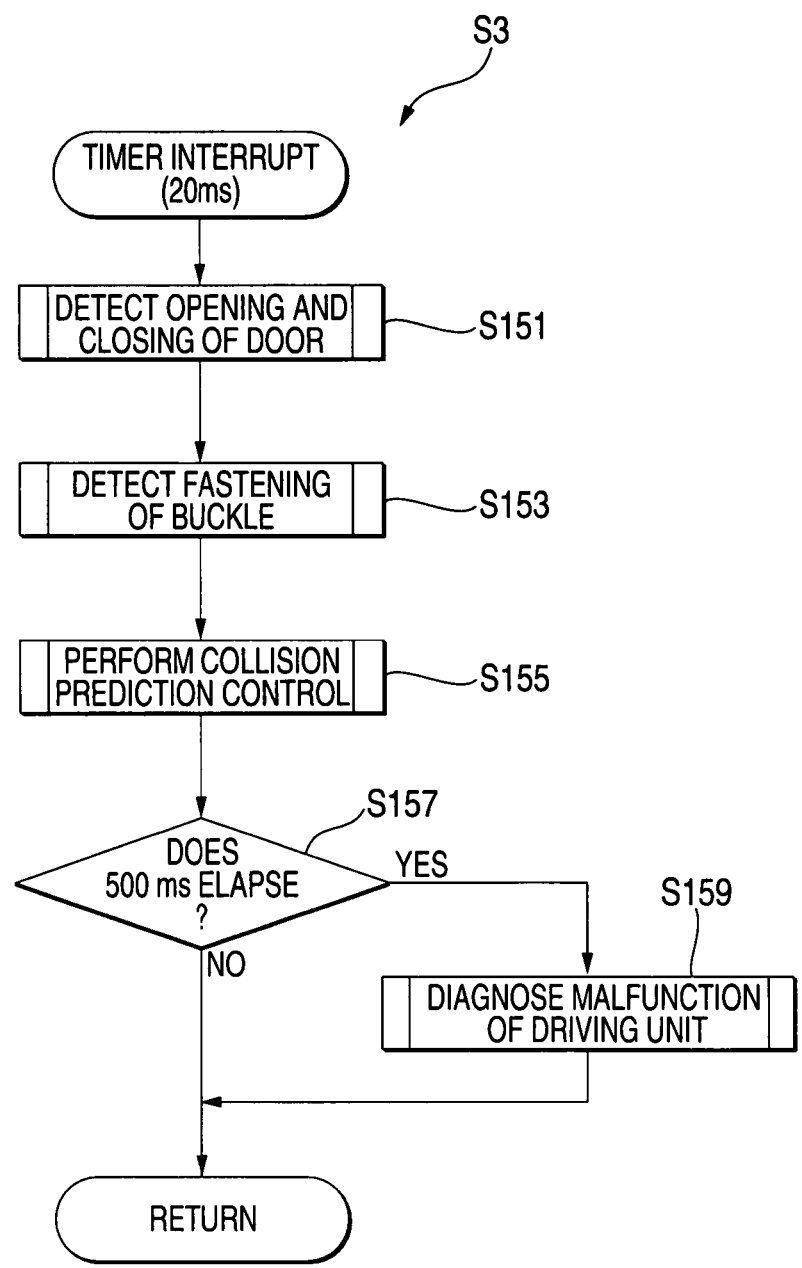
FIG. 9 is a flowchart of a timer interrupt.
Figure 10:
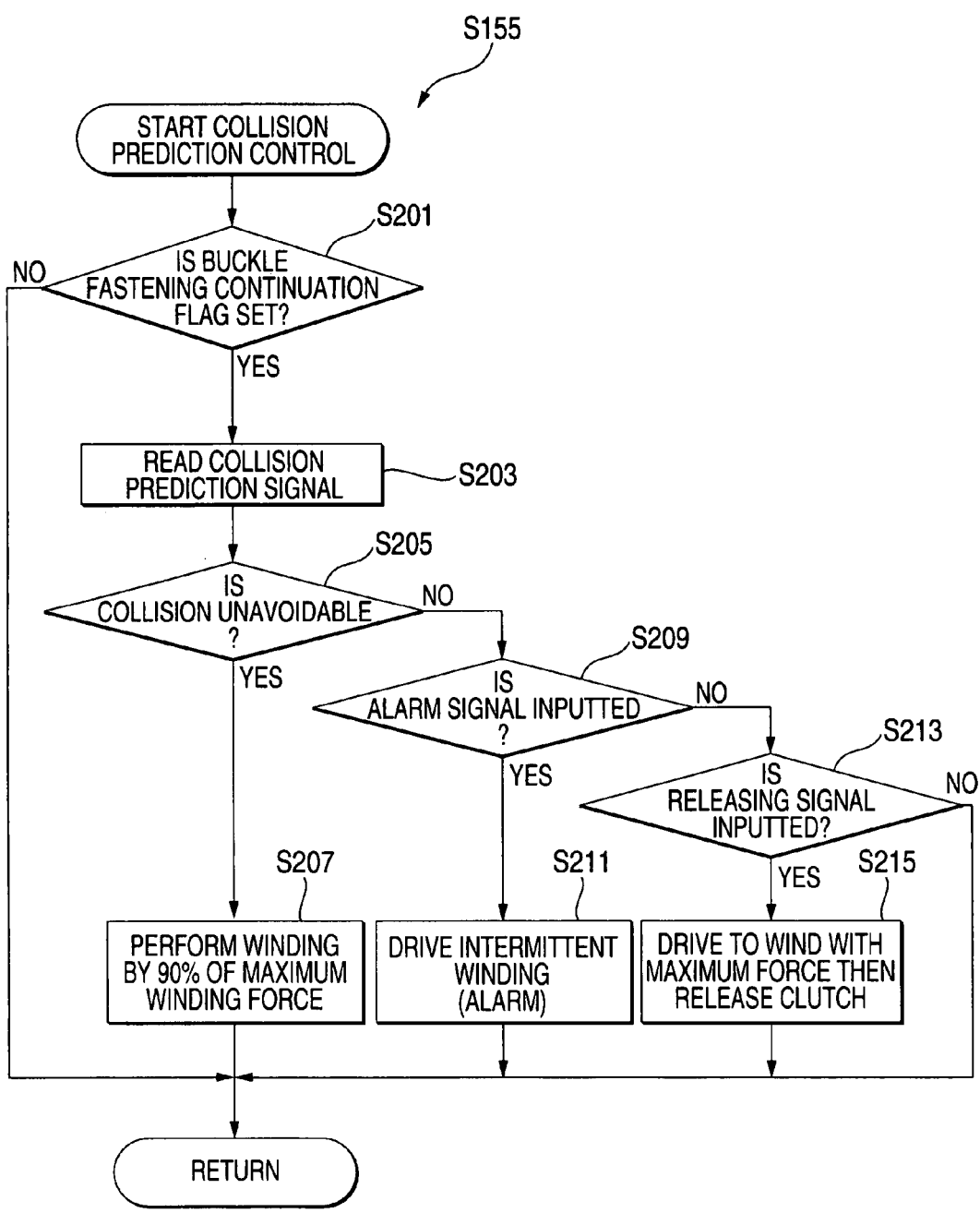
FIG. 10 is a flowchart of a collision prediction control.

Referring to FIG. 3 again, timer interrupt is permitted (S3). For example, the timer interrupt time is set to 20 ms, the interrupt enters every 20 ms, and thus a process shown in FIG. 9 is performed. First, opening and closing of the door is detected (S151). Herein, the opening and closing of the door is detected by how many times the door closing detection is performed until a door opening and closing detecting counter reaches a predetermined number and a predetermined flag is set. Next, a buckle fastening detection (S153) is performed with the signal from the seat belt fastening detecting means (S307). Herein, the fastening/non-fastening of the buckle is detected by how many times the buckle fastening is detected until the buckle fastening counter reaches a predetermined number. Then, the previous detected result is compared with the current detected result, it is judged whether a variation in the buckle fastening exists or not, and then a predetermined flag is set.

Next, a collision prediction control (S155) is performed. As a control flow shown in FIG. 10, in the collision prediction control (S155) it is judged whether a buckle-fastening continuation flag is set or not (S201). When the flag is not set (S201: No), it returns. When the flag is set (S201: Yes), a collision prediction signal is read from the dangerous state detecting means 120 (S203) and it is judged whether the collision is unavoidable or not from the signal (S205). Herein, the unavoidable collision means that the collision cannot be avoided by the operation of the occupant 2. When judged as the unavoidable collision (S205: Yes), the seat belt device 1 is wound at a high velocity with 90% of the maximum driving power, for example, for 3 seconds (S207) and then, it returns. This operation is preferentially performed with respect to the other operations. The time of 3 seconds is just an example and it is preferable that the time is set to a time that is required for constraining the occupant 2 in the unavoidable collision state.

When judged as an avoidable collision (not unavoidable collision) (S205: No), it is judged whether an alarm signal is inputted or not (S209). When judged that the alarm signal is inputted (S209: Yes), an intermittent winding driving of the webbing 302 is performed (S211), whereby the danger for the occupant 2 is noticed and then it returns. When judged that the alarm signal is not inputted (S209: No), it is judged whether a release signal is inputted or not (S213). When judged that the release signal is inputted (S213: Yes), the winding driving at the maximum driving power and a later described clutch releasing (S215) is performed to release the clutch 150 and then it returns.

Referring to FIG. 9 again, when the collision prediction control (S155) is completed, it is judged whether 500 ms has elapsed (S157). That is, a 500 ms counter is set in the RAM (register), the counter increments every 20 ms of the timer interrupt, and it is judged whether the count value reaches 500 ms or not. When judged that 500 ms has elapsed (S157: Yes), a driving unit malfunction diagnosis (S159) is performed and it returns. When 500 ms does not elapse (S157: No), the driving unit malfunction diagnosis is not performed and it returns.

Although the driving unit malfunction diagnosis (S159) is not indicated by a particular control flow, the diagnosis is detected by whether the motor driving is not continuously performed for a predetermined time or more. That is, when a current flowing on the motor 110 by a current detecting circuit is a minimum current required for driving the motor 110 or less, a driving unit abnormal flag set in the RAM (register) is cleared. For example, when the motor 110 is continuously driven for 10 second or more, the driving unit abnormal flag is set. Herein 10 second is just an example and it is preferable that the time is set as the maximum time or more of a general motor driving.

Referring to FIG. 3 again, the buckle state is judged by the buckle fastening detection performed every timer interrupt mentioned above (S5), whereby the related flags are cleared (S15, S17, S19, and S21), and then the before-fastening control (S23), the initial fastening control (S25), the during-fastening control (S27), or the storing control (S29) is performed. In the buckle fastening detection (S5), the buckle states are detected by setting states of the flags indicating the buckle states.

Figure 11:
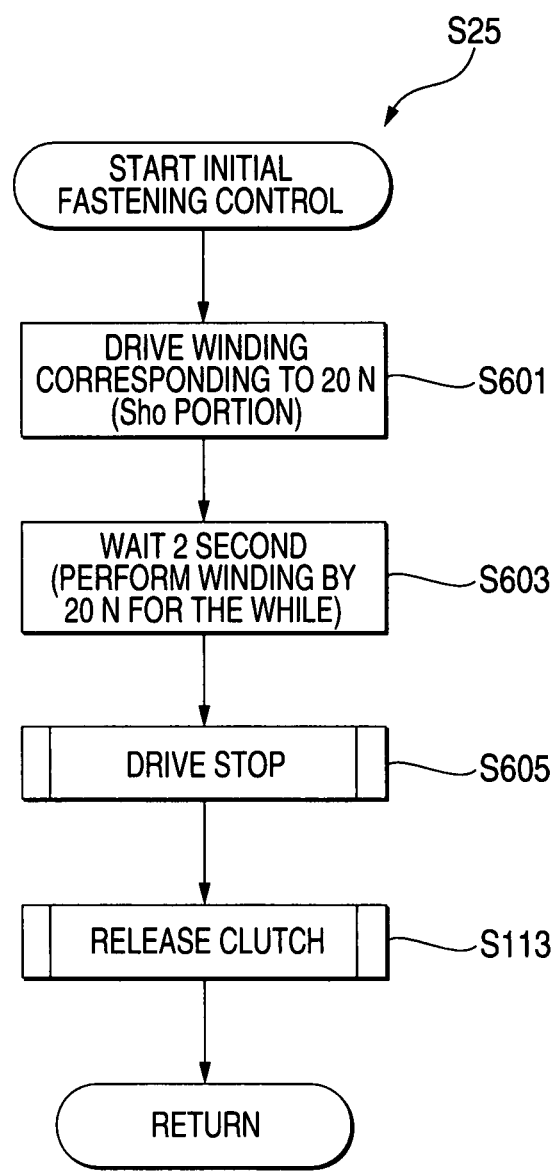
FIG. 11 is a flowchart of an initial fastening control.
Figure 12:
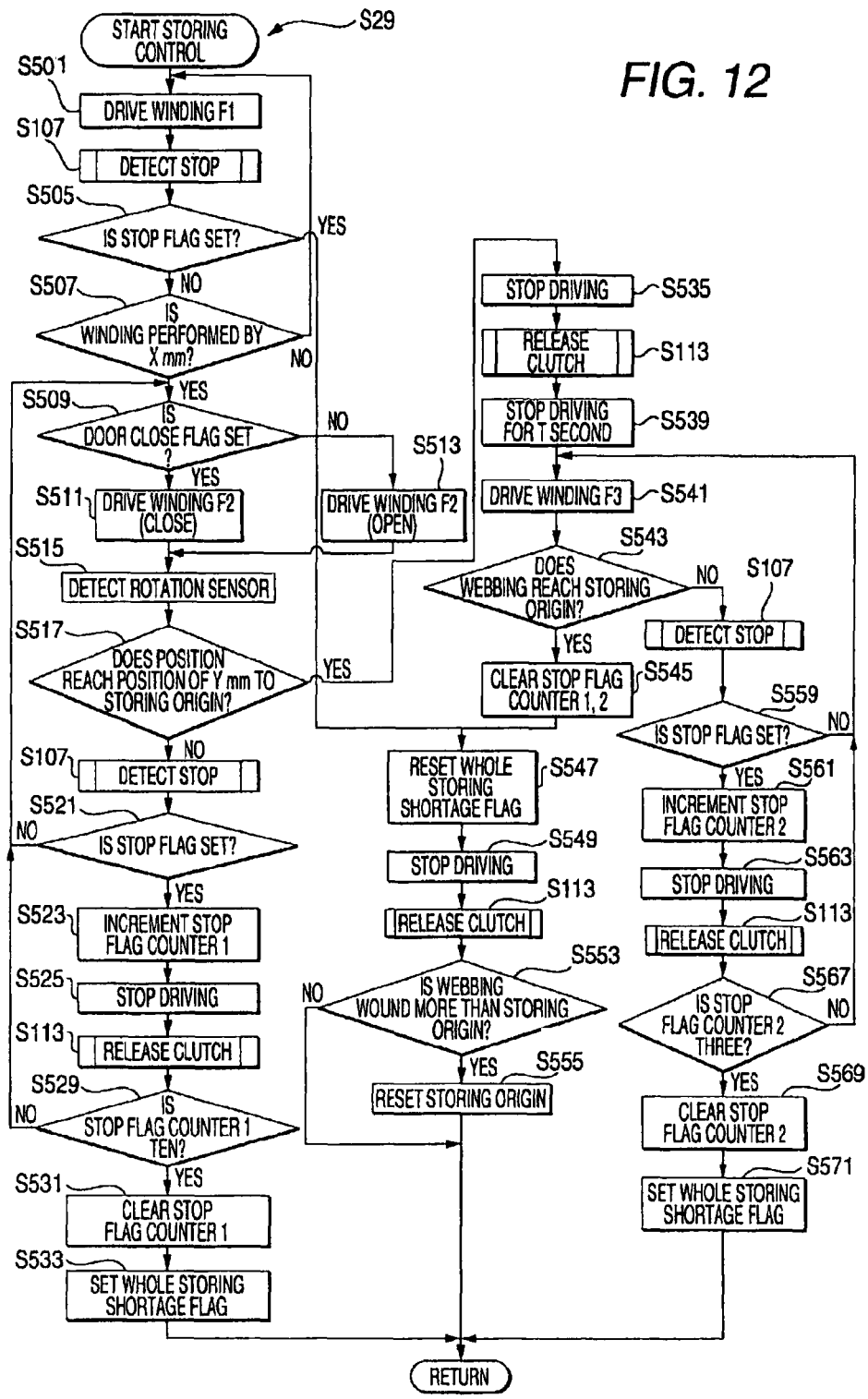
FIG. 12 is a flowchart of a storing control.
Figure 13:
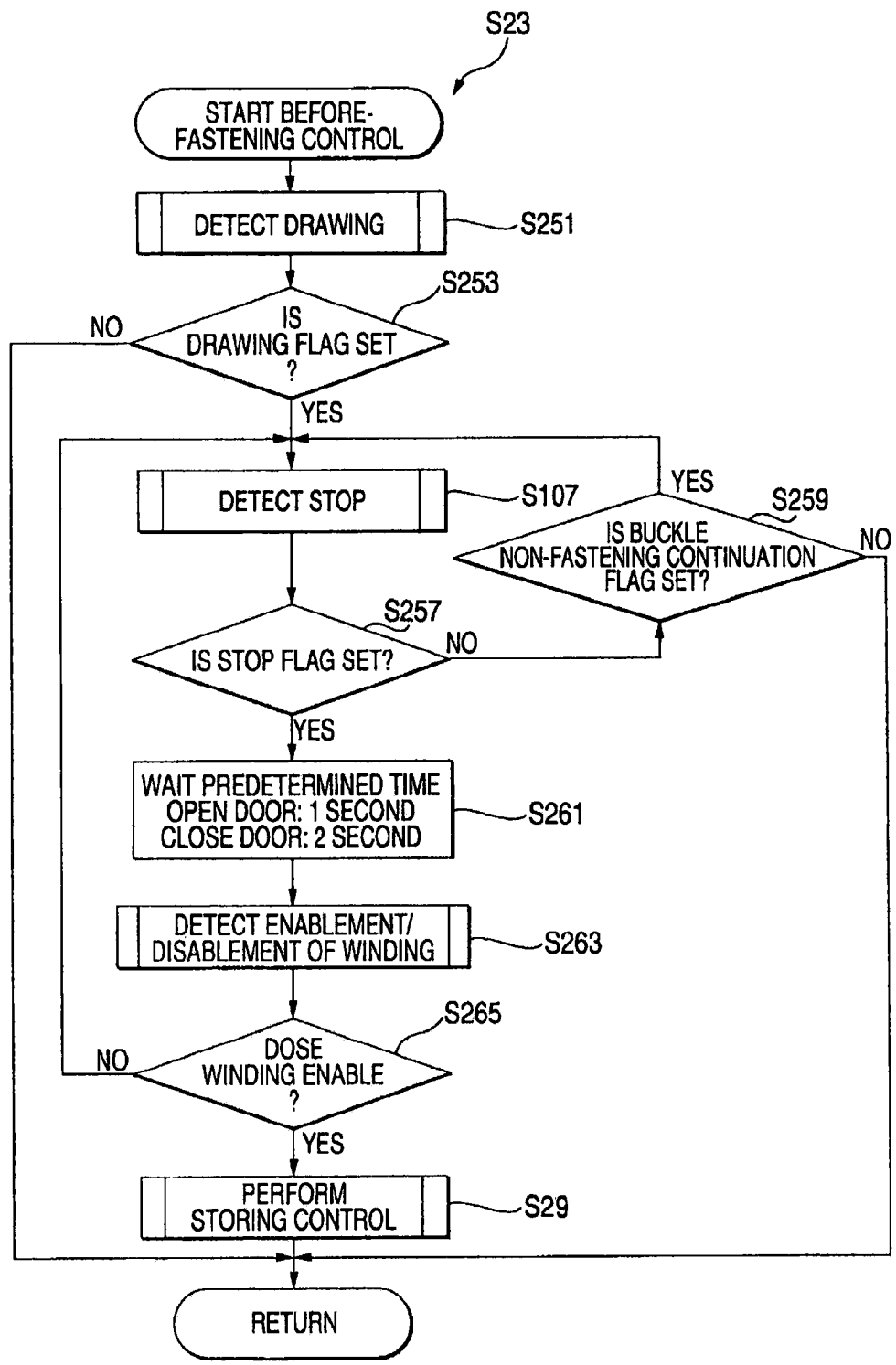
FIG. 13 is a flowchart of a before-fastening control.

When judged as a buckle non-fastening continuation (S7), the related flag is cleared (S15) and then the before-fastening control (S23) shown in FIG. 13 is performed. When judged that it is transferred from nonfastening of the buckle to fastening of the buckle (S9), the related flag is cleared (S17) and then the initial fastening control (S25) shown in FIG. 11 is performed. When judged as the buckle fastening continuation (S11), the related flag is cleared (S19) and then the during-fastening control (S27) shown in FIG. 15 is performed. In other cases (transfer from the fastening of the buckle to the non-fastening of the buckle; the door signal changes and the whole storing shortage flag is set; and the door is opened, the whole storing shortage flag is set, and the winding is detected) (S13), the related flag is cleared (S21) and then the storing control (S29) shown in FIG. 12 is performed.

Figure 8:
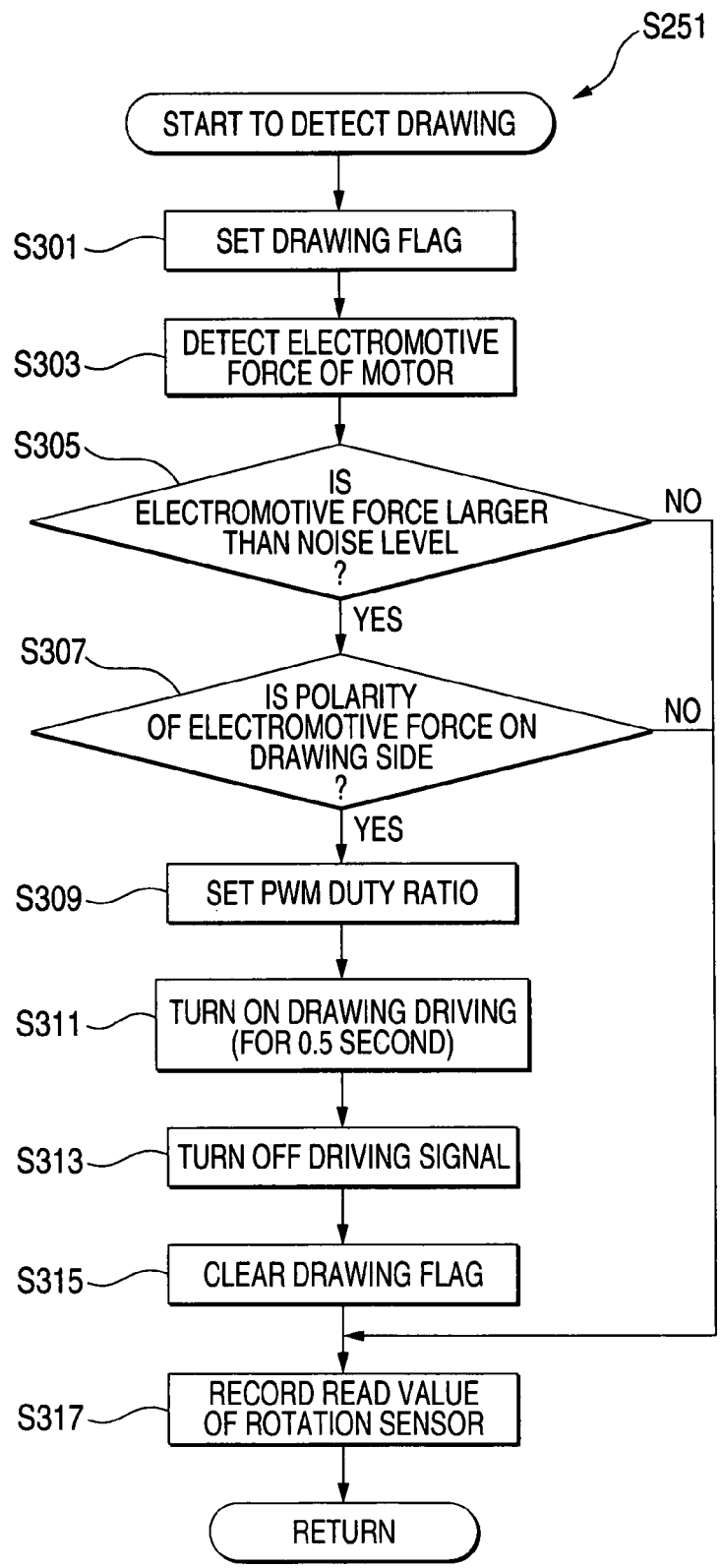
FIG. 8 is a flowchart of detecting drawing.

In the before-fastening control (S23), as shown in FIG. 13, a drawing detection (S251), which detects whether the webbing 302 is drawn or not, is performed. As the drawing detection (S251) is main part of the invention, detailed explanation will follow. Specifically, as shown in FIG. 8, the drawing flag is set (S301) and then the electromotive force detection (S303) of the electric motor 110 is performed by the motor drawing-direction rotation detecting means 119, whereby the motor drawing-direction rotation detecting means 119 detects the existence of an electromotive force generated when the driving power is not being supplied to the electric motor 110. That is, generation of the electromotive force in a state where the driving power is not being supplied to the electric motor 110 means that the clutch is not released due to something failing, such as when the webbing 302 is drawn by manual operation in the engaged state of the clutch 150, and the electric motor 110 is rotating by the rotation of the spindle 103 (drag of the electric motor 110).

Then, it is judged whether the detected electromotive force is higher than the noise level or not (S305). When the force is lower than the noise level (S305: No), the read value of the rotation sensor is recorded on a predetermined portion in the RAM (S317) and then it returns. When the electromotive force is higher than the noise level (S305: Yes), it is determined if polarity of the electromotive force is on the drawing side or not (S307). When the force does not have the polarity on the drawing side (S307: No), the read value of the rotation sensor is recorded on a predetermined portion in the RAM (S317) and then it returns. When the force does have the polarity on the drawing side (S307: Yes), the PWM duty ratio is set (S309). Herein, the set PWM duty ratio is set at a velocity higher than the drawing velocity of the webbing 302 by manual operation of the occupant 2. Next, the drawing driving is set to ON (S311) for 0.5 seconds and then the driving signal is changed to OFF (S313), whereby the electric motor 110 is rotated in the drawing direction of the webbing 302 for 0.5 second so as to release the clutch 150. Next, the drawing flag is cleared (S315) and then the read value of the rotation sensor is recorded on a predetermined portion in the RAM (S317) and then it returns. Note that in the drawing detection of the webbing 302 in the engaged clutch state, an encoder, and the motor drawing-direction rotation detecting means 119 which detects the electromotive force of the electric motor 110 are simultaneously used. The reason is that the encoder alone cannot detect the drag of the electric motor 110.

Herein, the clutch 150 housed in the spindle side pulley 115 is described with reference to FIG. 16. The clutch 150 has a gear 151, a clutch housing 152, a pole 153, a friction spring 154, and a rotary shaft 155. The gear 151 has a gearwheel 151a engaged with a motor side gear (not shown) driven by the electric motor 110 in its outer peripheral surface and rotates with the rotation of the electric motor 110. The clutch housing 152 is connected to the spindle 103 and an internal gear 152a is formed in the internal diameter surface thereof. In a part disposed in the internal diameter side of the clutch housing 152 of the gear 151, a guide portion 151b slidably fitting the pole 153 is provided. In the front end of the pole 153, an engaging gear 153a which is engaged with the internal gear 152a of the clutch housing 152 is formed. A middle portion of the friction spring 154 disposed with the rotary shaft 155 interposed therebetween is engaged with a projecting portion 153b of the pole 153 and applies resistance to the pole 153 in the rotating direction. When the pole 153 is slid along the guide portion 151b and projects the engaging gear 153a from the gear 151, the projecting portion 153b is engaged with the internal gear 152a to be the engaged clutch state (refer to FIG. 16A). When the engaging gear 153a is buried in the gear 151, the engagement is released to be the released clutch state (refer to FIG. 16B.

That is, in the released clutch state shown in FIG. 16B and the gear 151 is rotated by the electric motor 110 in the winding direction (clockwise direction in FIG. 16B) of the webbing 302, the pole 153 also tends to rotate. However, the pole 153 is suppressed to rotate due to the friction effect of the friction spring 154 and gradually moves in the outer peripheral direction, and thereafter, the engaging gear 153a is engaged with the internal gear 152a of the clutch housing 152, and then the rotation of the gear 151 is transmitted to the clutch housing 152. That is, when the electric motor 110 rotates in the winding direction of the webbing 302, the clutch 150 housed in the spindle side pulley 115 is ON, the power of the electric motor 110 is transmitted to the spindle 103 and rotates the spindle 103, and thus the webbing 302 is wound.

Next, in the engaged clutch state shown in FIG. 16A, when the gear 151 is rotated by the electric motor 110 in a direction opposite to the winding direction (i.e. drawing direction of the webbing 302, anticlockwise direction in FIG. 16A) of the webbing 302, the pole 153 also tends to rotate. However, since the rotation of the pole 153 is suppressed by the friction spring 154, the pole 153 gradually moves to inside of the gear 151, the engaging gear 153a is disengaged from the internal gear 152a of the clutch housing 152, and thus the clutch 150 is released.

In short, in the drawing detection (S251) shown in FIG. 8, although the driving power is not supplied to the electric motor 110, it is detected that the electric motor 110 rotating in the drawing direction of the webbing 302, it is judged that the clutch 150 to be released cannot be released at the time when the webbing 302 is drawn by the manual operation of the occupant 2, the drawing driving is performed by the electric motor 110 (S311), and the electric motor 110 is rotated in the drawing direction of the webbing 302 only for 0.5 second. As described above, since the clutch 150 is released forcibly, the webbing 302 can be drawn without the extra drawing resistance.

Figure 6:
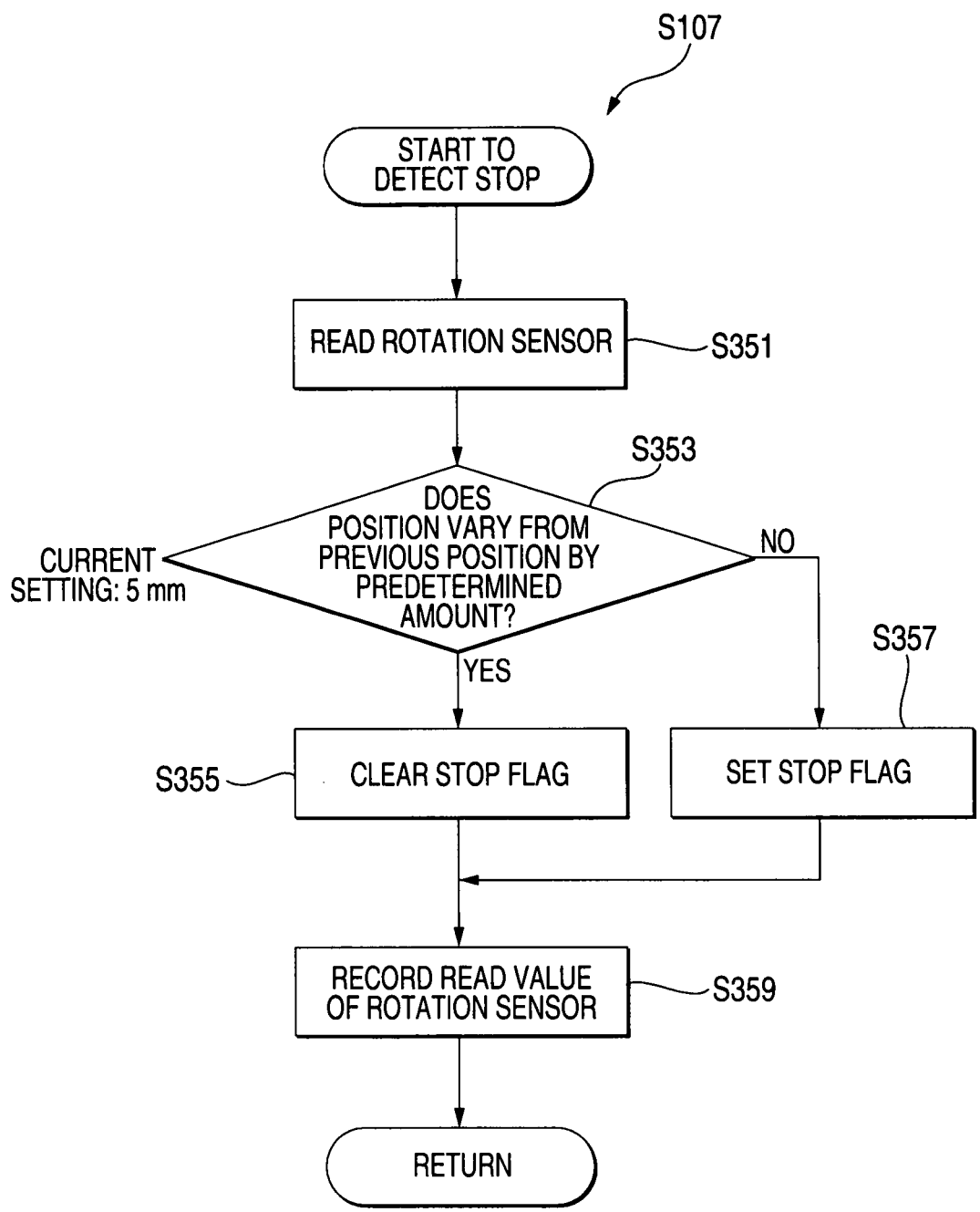
FIG. 6 is a flowchart of detecting stop.

Referring to FIG. 13 again, the drawing detection (S251) is performed and then it is judged whether the drawing flag is set or not (S253). When the drawing flag is not set (S253: No), the before-fastening control (S23) returns. Meanwhile, when the drawing flag is set (S253: Yes), the stop detection (S107) shown in FIG. 6 is performed. In the stop detection (S107), as shown in FIG. 6, the stop of the webbing 302 (state that the webbing 302 is not drawn and wound) is detected. First, the output of the rotation sensor detecting the rotating amount of the spindle 103 is read (S351). Next, the read rotating amount is compared with the previous rotating amount and it is judged that a variation of a predetermined amount (for example 5 mm) has occurred or not (S353). When the previous rotating amount is different from the current rotating amount by the predetermined amount (S353: Yes), it is judged that the webbing 302 does not stop and then the stop flag is cleared (S355). Meanwhile, when the previous rotating amount is not different from the current rotating amount by the predetermined amount (S353: No), it is judged that the webbing 302 stops, the stop flag is set (S357), the read value of the rotation sensor is stored on a predetermined portion in the RAM (S359), and then it returns.

Referring to FIG. 13 again, the stop detection (S107) is performed and then it is judged whether the stop flag is set or not (S257). When the stop flag is not set (S257: No), it is judged that the non-fastening of the buckle continuation flag is set or not (S259). When the non-fastening of the buckle continuation flag is set (S259: Yes), it returns to the stop detection (S107). When the non-fastening of the buckle continuation flag is not set (S259: No), it returns. When the stop flag is set (S257: Yes), it is waited for predetermined time (S261) and then a winding enablement/disablement detection (S263) shown in FIG. 14 is performed.

Figure 14:
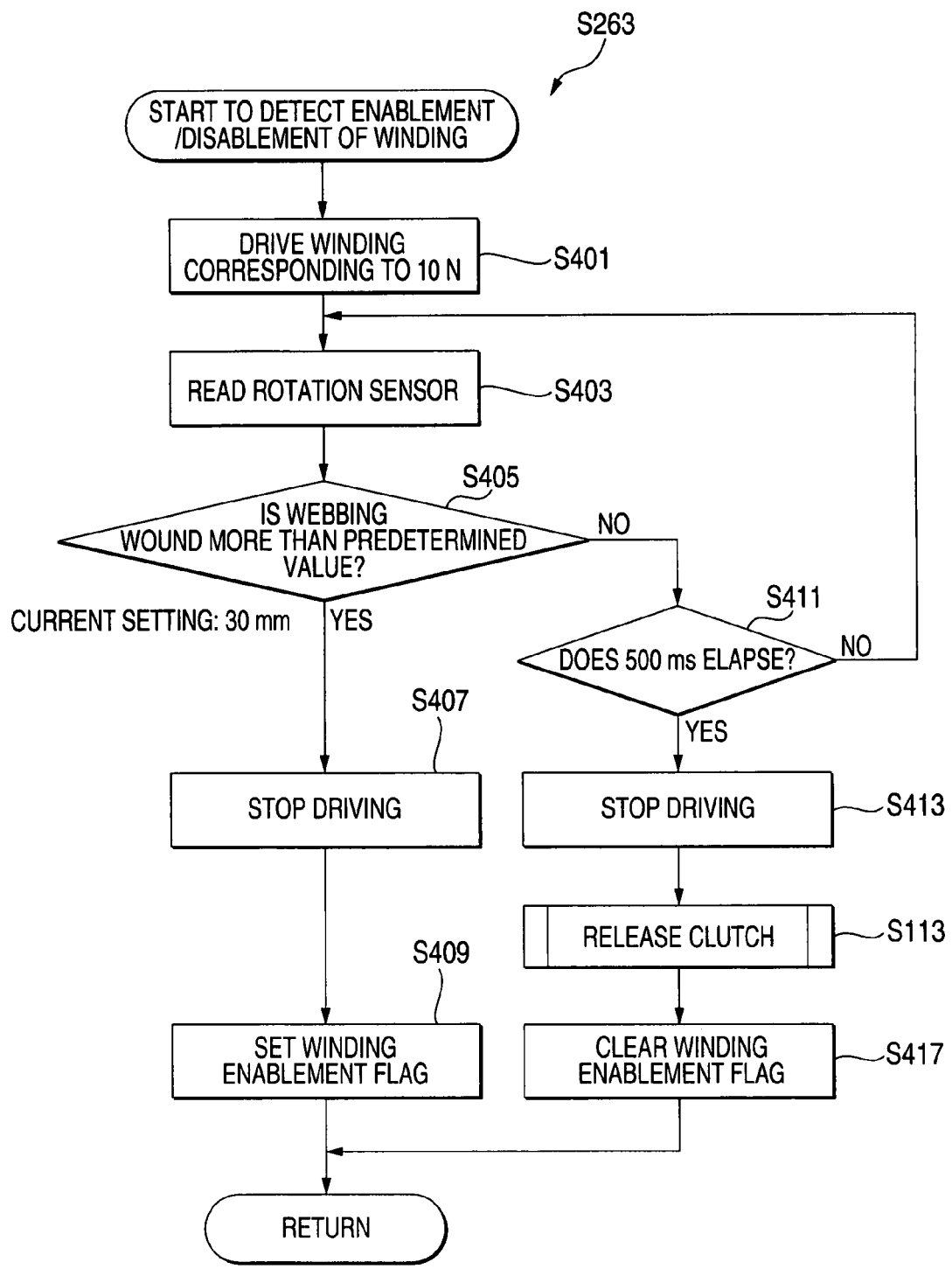
FIG. 14 is a flowchart of detecting enablement/disablement of winding.

In the winding enablement/disablement detection (S263), as shown in FIG. 14, the winding driving (S401) is performed with a force corresponding to 10 N and then a rotation sensor reading (S403) is performed. Next, it is judged whether the winding is performed greater than a predetermined value (for example, 30 mm) or not (S405). When judged that the winding is performed greater than the predetermined value (S405: Yes), the driving stops (S407), the winding enablement flag is set (S409), and then it returns. When judged that the winding is not performed greater than the predetermined value (S405: No), it is judged whether 500 ms has elapsed or not (S411). When 500 ms does not elapse (S411: No), it returns to the rotation sensor reading (S403). Meanwhile, when 500 ms does elapse (S411: Yes), the driving stops (S413), the clutch releasing (S113) shown in FIG. 7 is performed, the winding enablement flag is cleared (S417), and then it returns.

Figure 7:
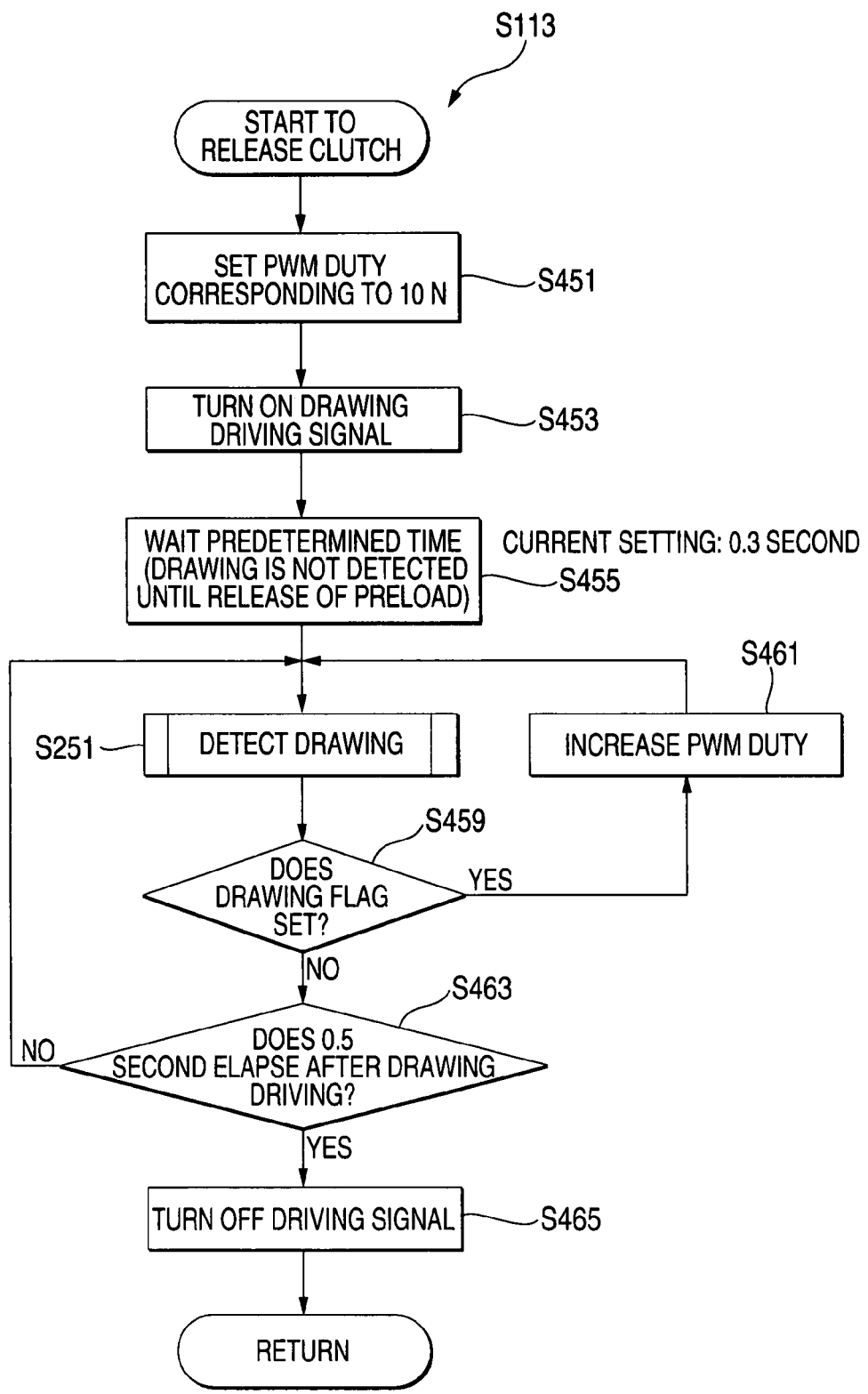
FIG. 7 is a flowchart of releasing a clutch.

In the clutch releasing (S113), as shown in FIG. 7, in order to set a force of the motor 110 to be corresponding to 10 N, the duty ratio of the PWM signal applied to the motor is set (S451) and then the drawing driving signal is turned ON (S453). Then, for example, it waits for 0.3 seconds so as not to detect the drawing until the preload is released (S455). Next, the above described drawing detection (S251) in FIG. 8 is performed, whereby it is judged whether the drawing flag is set or not (S459). When judged that the drawing flag is set (S459: Yes), the duty ratio of the PWM signal is increased (S461) and then it returns to the drawing detection (S251). When judged that the drawing flag is not set (S459: No), it is judged whether 0.5 seconds elapses or not (S463) after the drawing driving. When judged that 0.5 seconds does not elapse (S463: No), it returns to the drawing detection (S251). Meanwhile, when judged that the 0.5 seconds elapses (S463: Yes), the driving signal is turned OFF (S465) and then it returns.

Referring to FIG. 13 again, after completing the winding enablement/disablement detecting (S263) it is judged whether the winding enablement flag is set or not (S265). When judged as the winding disablement (S265: No), it returns to the stop detection (S107). When judged as the winding enablement (S265: Yes), the storing control (S29) shown in FIG. 12 is performed and then it returns.

In the storing control (S29), as shown in FIG. 12, the winding driving (S501) is performed, the above described stop detection (S107) shown in FIG. 6 is performed, and then it is judged whether the stop flag is set or not (S505). When the stop flag is set (S505: Yes), it is transferred to a later described stop driving (S549). When judged that the stop flag is not set (S505: No), it is judged whether the winding is performed by a predetermined amount (X mm) (S507). When judged that the winding is not performed by the predetermined amount (X mm) (S507: No), it returns to the winding driving (S501). When judged that the winding is performed by the predetermined amount (X mm) (S507: Yes), it is judged whether the door close flag is set or not (S509). When the door close flag is set (S509: Yes), the winding driving at closing the door (winding driving at low velocity) is performed (S511). When the door close flag is not set (S509: No), the winding driving at opening the door (winding driving at middle velocity) is performed (S513). Therefore, when the door is in the opened state, this winding driving occurs in order to prevent the webbing 302 from being in a state that the storing is not completed at the time of closing the door, thereby, preventing the webbing 302 from being pinched by the door.

After the winding driving (S511) or (S513) is performed, the detection of position is performed by the rotation sensor (S515), and it is judged whether a position has been reached with a predetermined amount (Y mm) to the storing origin or not (S517). Herein, preferably, the position with the predetermined value is a position where the drawing amount of the webbing 302 prevents the webbing 302 from being pinched by the door.

This operation also has a purpose of avoiding collision between an interior member within the vehicle 3 and the tongue plate 305, which is achieved by once stopping winding the webbing 302 at a certain position. That is, during webbing winding in the storing operation, the tongue plate 305 moves together with the webbing 302 with a certain velocity. Then, there is a possibility that the interior member is damaged due to the collision therebetween. However, at the time of stopping the winding, when the webbing 302 is located outside of the vehicle together with the tongue plate 305, the webbing 302 are pinched by the door and thus the webbing 302 may be damaged.

Accordingly, it is not preferable in consideration of strength of the webbing 302 thereafter. In order to prevent this problem as described above, the position for the instant stop of winding the webbing 302 is, at least, where the webbing 302 is not pinched by the door.

When the position does not reach the predetermined amount (Y mm) to the storing origin (S517: No), the above described stop detection (S107) shown in FIG. 6 is performed and then it is judged whether the stop flag is set or not (S521). When the stop flag is not set (S521: No), it returns to the judgment of the door close flag setting (S509). When the stop flag is set (S521: Yes), the stop flag counter #1 is incremented (S523), the driving stops (S525) to stop the webbing driving, and then the above described clutch release (S113) shown in FIG. 7 is performed. Next, it is judged whether the stop flag counter #1 is ten or not (S529). When the stop flag counter #1 is not ten (S529: No), it returns to the judgment of the door close flag setting (S509). When the stop flag counter #1 is ten (S529: Yes), the stop flag counter #1 is cleared (S531), the whole storing shortage flag is set (S533), and then it returns.

On the other hand, in the step of (S517), when reaching a position with the predetermined amount (Y mm) to the storing origin (S517: Yes), the driving stops (S535) to stop the webbing winding, and then the above described clutch release (S113) shown in FIG. 7 is performed. Then, the driving stops for T seconds again (S539), the winding driving is performed (S541), and then it is judged whether reaching the origin or not (S543). When judged that it is reached to the storing origin (S543: Yes), the stop flag counters #1, #2 are cleared (S545), the whole storing shortage flag is reset (S547), and then the driving stops (S549). Then, the above described clutch release (S113) shown in FIG. 7 is performed and then it is judged whether the winding is performed more than the storing origin or not (S553). When the winding is not performed more than the storing origin (S553: No), it returns. When the winding is performed more than the storing origin (S553: Yes), the rotating amount of the spindle 103 detected by the rotation sensor at the position is reset as the storing origin again (S555) and then it returns.

In the step of (S543), when it is not reached to the storing origin (S543: No), the above described stop detection (S107) shown in FIG. 6 is performed and then it is judged whether the stop flag is set or not (S559). When the stop flag is not set (S559: No), it returns to the winding driving (S541). When the stop flag is set (S559: Yes), the stop flag counter #2 is increased (S561), the driving stops (S563) to stop the webbing winding, and then the above described clutch release (S113) shown in during-fastening control (S27) is performed.

In the during-fastening control (S27), as shown in FIG. 15, a through-anchor movement detection (S651) is performed. In the through-anchor movement detection, the movement of the shoulder portion in the up/down direction of the vehicle 3 is detected by a sliding potentiometer and the output thereof is read and detected by the control means 200. This detection is performed by the timer interrupt every predetermined time. Then, it is judged whether the through-anchor movement flag is set or not (S653). When the flag is set (S653: Yes), the initial fastening control (S25) described in FIG. 11 is performed and then it returns. Meanwhile, when the through-anchor movement flag is not set (S653: No), a seat back-forth movement detection (S655) is performed. When the seat moves, it is detected that the seat stops and then a seat back-forth movement flag set. Then, it is judged whether the seat back-forth movement flag is set or not (S657). When the flag is set (S657: Yes), the above described initial fastening control (S25) shown in FIG. 11 is performed and then it returns.

Meanwhile, when the seat back-forth movement flag is not set (S657: No), a seat back angle-variation detection (S659) is performed. In the seat back angle-variation detection, an angle between a seat-cushion and the seatback is detected by a potentiometer for angle detection, the signal according to the angle is outputted to the control means 200, the control means 200 reads the output every predetermined timer interrupt, judges that difference between the angle due to the previous timer interrupt and the angle due to the current timer interrupt, and then judges whether the angle is varying or not. When the variation stops, the seat back angle-variation flag is set. Then it is judged whether the seat back angle-variation flag is set or not (S661). When the flag is set (S661: Yes), the above-described initial fastening control (S25) shown in FIG. 11 is performed. When the flag is not set (S661: No), it returns. These series of operations is performed so as to remove the looseness of the webbing 302.

Referring to FIG. 3, when it is detected from the related flag that either the buckle state is transferred from the fastening to non-fastening; the door signal changes and the whole storing shortage flag is set; or the door is opened, the whole storing shortage flag is set, and the winding stops (S13), then the related flag is cleared (S21) and the above described storing control (S29) shown in FIG. 12 is performed.

Then, as shown in FIG. 3, after the control in the buckle states is performed, a sleep IN control (S31) is performed. In the control, the sleep IN flag is set when the webbing 302 is not drawn, when the objective door is closed, and after IG OFF, for example, when 5 minutes or more elapses. In other cases, the sleep IN flag is cleared. It is judged whether the sleep IN flag is set or not (S33) after the sleep IN control (S31) is performed. When the flag is not set (S33: No), it returns to the buckle state judgment (S5). When the flag is set (S33: Yes), it is transferred to a sleep mode (S35). The object is to reduce current consumption which means any operation except for preparation for returning from the sleep mode are not performed. Then, a sleep OUT detection (S37) is performed. In the detection, the sleep OUT flag is set when detecting any one of the drawing detection, the open door, or IG ON. In other cases, the sleep OUT flag is cleared. Then, it is judged whether the sleep OUT flag is set or not (S39). When the flag is not set (S39: No), it returns to the sleep OUT detection (S37). When the flag is set (S39: Yes), it returns to the buckle state judgment (S5) again and then the same controls are performed.

Accordingly, the seat belt retractor 100 of the embodiment has the spindle 103 which winds the webbing 302, power generation means 110 which generates power for rotating the spindle 103 in a desired direction, power transmission means 104 which enables transmission of the power of the power generation means 110 to the spindle 103 when the power generation means 110 generates the power for rotating the spindle 103 in a winding direction of the webbing 302, and also disables transmission of the power of the power generation means 110 to the spindle 103 when the power generation means 110 generates power in a direction opposite to the power for rotating the spindle 103 in the winding direction, and control means 200 which controls the power generation means 110. The seat belt retractor 100 has stop state detecting means 118 which detects that a driving signal is not inputted to the power generation means 110 and a drawing-direction rotation detecting means 119 which detects that the power generation means 110 is rotating in the drawing direction of the webbing 302, wherein the control means 200 drives the power generation means 110 to rotate in the drawing direction of the webbing 302 when the stop state detecting means 118 detects that the driving signal is not inputted to the power generation means 110 and when the drawing-direction rotation detecting means 119 detects that the power transmission means 104 is rotating in the drawing direction of the webbing 302. Accordingly, the clutch 150 can be reliably released by rotating the power generation means 110 in the drawing direction of the webbing 302 when the clutch 150 housed in the power transmission means 104 is connected and the connection between the power generation means 110 and the spindle 103 is not released due to any problems in the course of drawing the webbing 302 and fastening the seat belt by the manual operation of the occupant 2. Since the occupant 2 can easily draw the webbing 302 and fasten the seat belt without the extra drawing resistance, the occupant can obtain the comfortable operation environment without unpleasant sensation. Further, when releasing the clutch 150, the occupant 2 also draws the webbing 302 so as to disturb the clutch release operation, the clutch 150 can be reliably released by rotating the power generation means 110 in the drawing direction of the webbing 302.

Since the power generation means 110 is an electric motor and the stop state detecting means 118 and the drawing-direction rotation detecting means 119 perform their detecting operations by measuring an electromotive force of the electric motor 110, the seat belt retractor 100 is compact and is easily mounted in the vehicle 3.

According to the seat belt device 1 by using the seat belt retractor 100 mentioned above, the occupant 2 can easily draw and fasten the webbing 302 without unpleasant sensation and can obtain a comfortable operation environment for the seat belt.

According to the control method of the seat belt retractor 100, there is provided the method of controlling the retractor 100 including spindle 103 which winds the webbing 302, power generation means 110 which generates a power for rotating the spindle 103 in a desired direction, and power transmission means 104 which enables transmission of the power of the power generation means 110 to the spindle 103 when the power generation means 110 generates the power for rotating the spindle 103 in a winding direction of the webbing 302, and also disables transmission of the power of the power generation means 110 to the spindle 103 when the power generation means 110 generates a power in a direction opposite to the power for rotating the spindle 103 in the winding direction, the method comprising the steps of judging whether a connection between the spindle 103 and the power generation means 110 by the power transmission means 104 is released or not when the spindle 103 rotates in the drawing direction of the webbing 302 and controlling the power generation means 110 to rotate in the drawing direction of the webbing 302 when judged that the connection by the power transmission means 104 is not released. Accordingly, even when the connection between the spindle 103 and the power generation means 110 is not released and the drawing resistance of the webbing 302 is increased due to any problems, the electric motor 110 rotates in the drawing direction of the webbing 302 and the clutch 150 is released, whereby the webbing 302 can be easily drawn and the seat belt device 1 can be easily fastened.

The invention is not limited to the above-described embodiment and may be properly deformed or improved.

The seat belt retractor 100 and the seat belt device 1 can be applied to all vehicles and provide the above described advantages in any cases.

This application claims the benefit of Japanese Patent application No. 2004-304585 filed on Oct. 19, 2004, which is hereby incorporated by reference.

The invention claimed is:

1. A seat belt retractor comprising:
   a spindle winding a webbing;
   an electric motor which generates power for rotating the spindle in a desired direction;
   a power transmission means including a clutch that enables transmission of the power of the electric motor to the spindle when the electric motor generates the power for rotating the spindle in a winding direction of the webbing, and also disables transmission of the power of the electric motor to the spindle when the electric motor generates a power in a direction opposite to the power for rotating the spindle in the winding direction;
   a control means which drives and controls the electric motor; and
   a drawing direction rotation detecting means which detects that the electric motor is rotating in a drawing direction of the webbing by measuring an electromotive force of the electric motor;
   wherein the control means in the course of drawing the webbing is operative to control the electric motor to rotate in the drawing direction of the webbing to release the clutch of the power transmission means, when driving power is not supplied to the electric motor and the drawing direction detecting means detects an electromotive force of the electric motor, the electromotive force being generated by drawing of the webbing by manual operation.

2. The seat belt retractor according to claim 1, further comprising:
   a drawing preventing means which prevents the webbing from being drawn by stopping the rotation of the spindle in the drawing direction of the webbing, when a rotational acceleration of the spindle in the drawing direction of the webbing is a predetermined value or more, or when a deceleration of a vehicle is a predetermined value or more; and
   a winding spring applying a torque in the winding direction of the webbing to the spindle.

3. A seat belt device having the seat belt retractor according to claim 1.

4. The seatbelt retractor of claim 1, wherein the control means is operable to rotate the electric motor only when the drawing direction rotation detection means detects an electromotive force of the electric motor.

5. A method of controlling a retractor comprising a spindle winding a webbing, an electric motor which generates power for rotating the spindle in a desired direction, and a power transmission means including a clutch that enables transmission of the power of the electric motor to the spindle when the electric motor generates the power for rotating the spindle in a winding direction of the webbing, and also disables transmission of the power of the electric motor to the spindle when the electric motor generates a power in a direction opposite to the power for rotating the spindle in the winding direction, the method comprising:
   judging whether a connection between the spindle and the electric motor by the clutch of the power transmission means is released when the spindle rotates in a drawing direction of the webbing by detecting an electromotive force of the electric motor generated by drawing of the webbing by manual operation; and
   controlling to drive the electric motor to rotate in the drawing direction of the webbing to release the clutch of the power transmission means when the connection by the clutch of the power transmission means is not released in the course of drawing the webbing.

6. The method according to claim 5, wherein when it is detected that a driving signal is not inputted to the electric motor and it is detected that the electric motor is rotating in the drawing direction of the webbing, it is judged that the connection by the power transmission means is not released.

7. The seatbelt retractor of claim 5, wherein the control means is operable to rotate the electric motor only when the drawing direction rotation detection means detects an electromotive force of the electric motor.

* * * * *